(12) United States Patent
Liu et al.

(10) Patent No.: US 8,023,426 B2
(45) Date of Patent: Sep. 20, 2011

(54) METHOD TO SELECT ACCESS POINT AND RELAY NODE IN MULTI-HOP WIRELESS NETWORKING

(75) Inventors: Hang Liu, Yardley, PA (US); Lin Luo, North Brunswick, NJ (US); Mingquan Wu, Plainsboro, NJ (US); Dekai Li, Yardley, PA (US)

(73) Assignee: Thomson Licensing, Boulogne-Billancourt (FR)

( * ) Notice: Subject to any disclaimer, the term of this patent is extended or adjusted under 35 U.S.C. 154(b) by 1 day.

(21) Appl. No.: 12/449,760

(22) PCT Filed: Mar. 1, 2007

(86) PCT No.: PCT/US2007/005565
§ 371 (c)(1),
(2), (4) Date: Aug. 25, 2009

(87) PCT Pub. No.: WO2008/105771
PCT Pub. Date: Sep. 4, 2008

(65) Prior Publication Data
US 2010/0091669 A1    Apr. 15, 2010

(51) Int. Cl.
*G01R 31/08* (2006.01)
(52) U.S. Cl. ........................................ 370/252; 370/238
(58) Field of Classification Search .......... 370/200–253, 370/335, 331, 522, 311; 455/571, 442, 445–460
See application file for complete search history.

(56) References Cited

U.S. PATENT DOCUMENTS

| | | | | |
|---|---|---|---|---|
| 6,711,409 | B1 * | 3/2004 | Zavgren et al. | 455/445 |
| 6,973,039 | B2 * | 12/2005 | Redi et al. | 370/238 |
| 7,796,716 | B2 * | 9/2010 | Bhukania et al. | 375/346 |
| 2002/0173310 | A1 | 11/2002 | Ebata et al. | |
| 2004/0039817 | A1 | 2/2004 | Lee et al. | |
| 2004/0165556 | A1 * | 8/2004 | Backes et al. | 370/331 |
| 2004/0204084 | A1 | 10/2004 | Tan et al. | |

FOREIGN PATENT DOCUMENTS

| | | |
|---|---|---|
| EP | 0464011 | 1/1992 |
| EP | 1473956 | 11/2004 |
| GB | 2370445 | 6/2002 |
| GB | 2421148 | 6/2006 |

OTHER PUBLICATIONS

Avaya, "Wireless Office Headset System" User Guide, AWH45/AWH55+, pp. 1-29, 2005.
International Search Report dated Apr. 11, 2008.

* cited by examiner

*Primary Examiner* — Pao Sinkantarakorn
*Assistant Examiner* — Iqbal Zaidi
(74) *Attorney, Agent, or Firm* — Robert D. Shedd; Joseph J. Opalach; Catherine A. Cooper

(57) ABSTRACT

A method and apparatus are described for selecting an access point in a wireless network, including initializing a channel index, recording a received signal power and information contained in one of a beacon message and a probe request response message, calculating an access link metric for each candidate access point, the access link $_{13}$ metric being between an end device and each candidate access point on the channel indexed by the channel index responsive to the received signal power and information receiving a path metric between each candidate access point and a gateway, estimating a function using the access link metric and the path metric, selecting one of the candidate access points based on the function and establishing a connection with the selected access point. Also described is a method and apparatus for maintaining a connection with an access point.

17 Claims, 6 Drawing Sheets

METHOD TO SELECT ACCESS POINT AND RELAY NODE IN MULTI-HOP WIRELESS NETWORKING

This application claims the benefit, under 35 U.S.C. §365 of International Application PCT/US2007/filed Mar. 1, 2007, which was published in accordance with PCT Article 21(2) on Sep. 4, 2008 in English.

FIELD OF THE INVENTION

The present invention relates to wireless networks and in particular to the selection of an access point or relay node in a multi-hop wireless network. An end device selects the access point or relay node, based on both the path metric inside the wireless network and the access link quality between the end device and the access point or relay node.

BACKGROUND OF THE INVENTION

Several methods have been proposed in the literature to select an access point (AP) in single-hop wireless networks. The conventional approach for AP selection is based on received signal strength indicator (RSSI), in which an end device associates with/connects to an AP having the strongest received signal strength. This policy, however, ignores other factors that are important to end devices (such as AP load). Such factors could lead to very bad performance. In one prior art, the number of associated/connected end devices is used as a metric to select an AP. However, this metric does not consider the access link quality between the end devices and AP. In another prior art method, an AP selection metric based on the total number of users/end devices associated with/connected to the AP and the average packet error rate of a user/end device is used to select an AP. However, the model used in this metric does not capture the bandwidth contention among the end devices and different link data rates of the end devices. In yet another prior art method, a centralized method for determining an end device/user-AP association/connection is used to ensure a network-wide max-min fair bandwidth allocation to users/end devices. However, this method requires a central controller that knows the bandwidth of each end device.

All of the above approaches were designed for single-hop wireless networks; where end devices are only one hop away from the wired backbone and the wireless access link is assumed to be the bottleneck. All the above methods do not jointly consider the impact of the access link quality and the quality change of the path inside the network to the communication performance of the end device's.

In a multi-hop wireless network, the communication performance of end devices (e.g., fairness, throughput) is not only affected by the access link but also by the connection between the AP/relay node (RN) and the gateway (GW)/base station (BS). Therefore, when the problem of AP/RN selection in multi-hop wireless networks is considered, the schemes for single-hop wireless network cannot be used. A new AP selection method that considers both the access link and the path quality inside the network needs to be developed.

A solution to the problem of how to select an AP/RN in multi-hop wireless networks by considering both the path metric inside the network and the access link quality from the end device to the AP would be advantageous.

SUMMARY OF THE INVENTION

The present invention relates to wireless networks and in particular to the selection of an access point or relay node in a multi-hop wireless network. APs/RNs are interconnected to form a backbone/infrastructure multi-hop wireless network. One or more APs/RNs are also connected to the wired infrastructure or the Internet acting as the GW/BS to access the Internet. The access point or relay node then selects the route/path for transmission of data to and from the Internet via a gateway or base station. End devices do not participate in packet relay and need associate with one AP/RN to gain the network access. An end device selects the access point or relay node based on both the path metric between the AP/RN and the GW/BS inside the wireless network and the access link quality between the end device and the access point or relay node. An end device can be a client node or a station or a host or a mobile node (or also generically called "node") and further may be a computer, a laptop, a PDA or a cell phone communicating with the wireless network via an interworking function. An end device may be stationary or mobile.

The present invention is a method and apparatus for an end device to select an access point (AP) or relay node (RN) in multi-hop wireless networks. In single-hop wireless networks, such as is found in a hot spot, the APs or base stations (BSs) are connected to the wired backbone and the end devices are only one hop away from the wired backbone. In such single hop arrangements the wireless link is generally the bottleneck. In multi-hop wireless networks the communication quality of an end device is determined by both the access link between the end, device and the AP/RN as well as the wireless connection from the associated AP/RN to the gateway (GW)/BS. As used herein, "/" denotes alternative names for the same or similar components or structures. Considering both segments on the communication path jointly, the present invention describes an AP/RN selection method in a multi-hop wireless network. The end devices evaluate the access link quality based on the information delivered in the beacon frames and probe response frames as well as their own measurements and calculations. The end devices are also aware of the path quality between each potential AP/RN and the GW/BS from the enhanced AP beacon or probe response during the scanning process. Combining these two metrics, the end devices make AP selection decisions to improve the communication quality between themselves and the gateway. The AP of the present invention may be a mesh AP or a tree AP, where "mesh" and "tree" denote possible topologies. Mesh APs and tree APs are current topological structures for wireless networks. The present invention is not limited to either or any particular network topology.

Multi-hop wireless networks are emerging as a promising technology that has applications in defense, metro-area Internet access and transient networks. In the present invention, infrastructure multi-hop wireless networks are considered. Infrastructure multi-hop wireless networks consist of relay nodes and end devices. Relay nodes are part of the network infrastructure and are interconnected to form a backbone multi-hop wireless network. Relay nodes participate in routing and packet forwarding. Relay nodes may also act as access points (AP) for the end devices. The end devices associate with/connect to an AP or RN to obtain network access. The end devices (such as PDAs, laptops, computers, cell phones, etc.) do not participate in the packet relay. The end devices depend on the APs/RNs to forward their packets to the destination. One or more relay nodes are also connected to the wired infrastructure or the Internet via one or more gateways to access the Internet.

Supporting communication between end devices and gateways in infrastructure multi-hop wireless networks requires the association/connection of end devices with/to a nearby AP. The AP/RN uses touting protocols in the backbone along with a routing metric to determine which route, among all possible routes, will be used for packet relay. The performance experienced by end devices depends heavily on both access link between the end device and the AP/RN as well as the wireless connection from the associated AP/RN to the gateway (GW)/BS. The former determines the quality of the access link, i.e., the edge/path between wireless backbone and end devices, while the latter determines the quality in the interior backbone infrastructure.

A method and apparatus are described for selecting an access point in a multi-hop wireless network, including calculating an access link cost for each candidate access point, receiving a path cost between each candidate access point and a gateway, estimating a joint access point selection cost function using the access link cost and the path cost, and selecting one of the candidate access points based on the joint access point selection cost function. The method and apparatus further establish a connection with the selected access point. The method and apparatus receive beacons and messages responsive to probe request messages containing received signal power and other information in order to measure and estimate an access link quality between an end device and an access point. Also described are a method and apparatus for maintaining a connection with an access point, monitoring a cost of the access point, monitoring costs of candidate access points, comparing a cost of the access point to a first predetermined threshold, comparing a difference between the cost of the access point and a cost of one of the candidate access points to a second predetermined threshold, if a result of the first comparison is below the first predetermined threshold, determining if the connection has continued for a predetermined period of time, if a result of the second comparison is greater than the second predetermined threshold, disconnecting from the access point and connecting to one of the candidate access points, if a result of the determination is positive.

BRIEF DESCRIPTION OF THE DRAWINGS

The present invention is best understood from the following detailed description when read in conjunction with the accompanying drawings. The drawings include the following figures briefly described below.

DETAILED DESCRIPTION OF THE PREFERRED EMBODIMENTS

A solution to the problem of how to select an AP/RN in multi-hop wireless networks by considering both the path metric inside the network and the access link quality from the end device to the AP is described herein.

Figure 1:
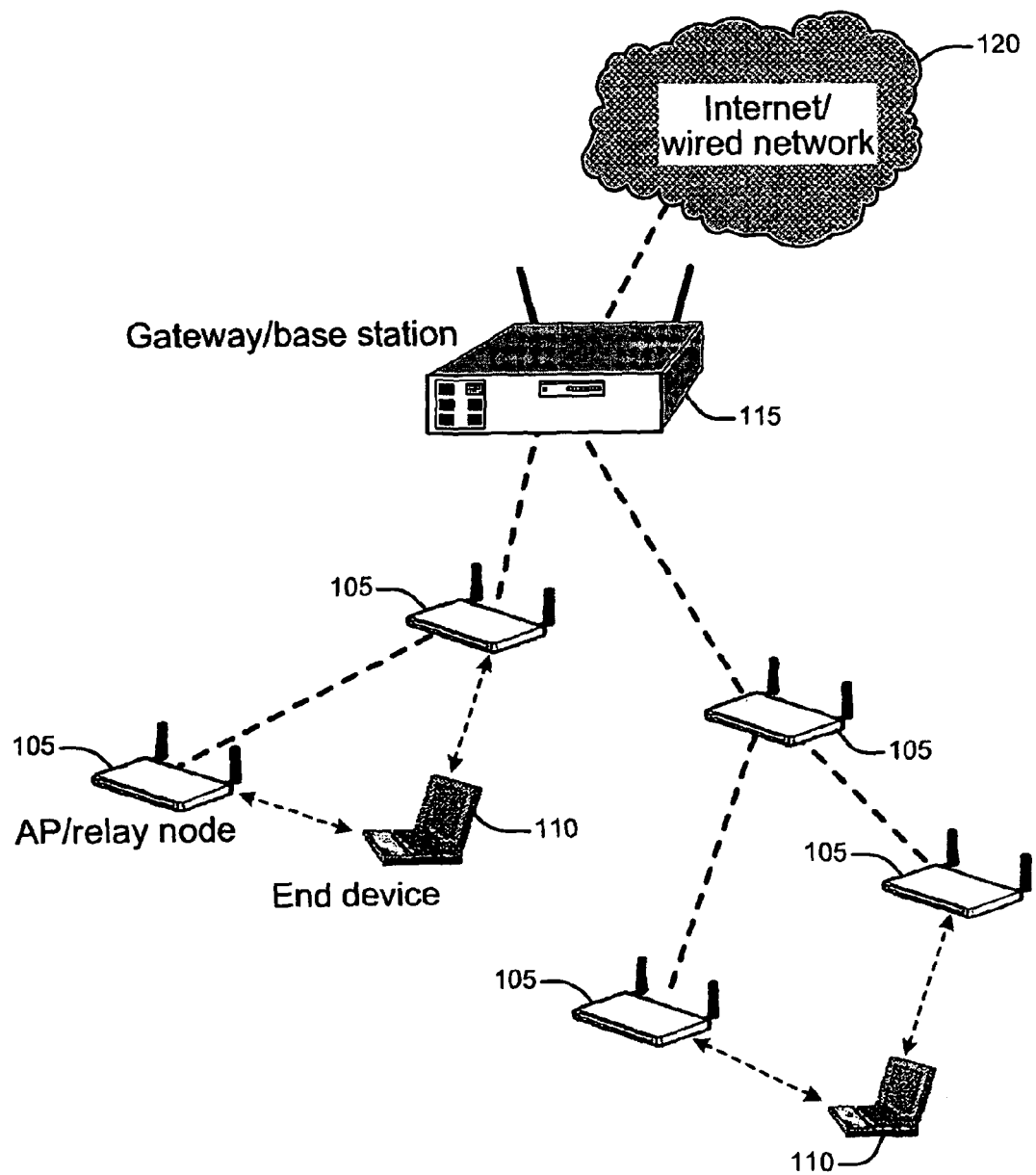
FIG. 1 is a schematic diagram of a network system in accordance with the principles of the present invention.

FIG. 1 is a schematic diagram of a network system in accordance with the principles of the present invention. The network system consists of three elements: relay nodes (RNs)/access points (APs) 105, end devices 110, and gateways (GWs)/base stations (BSs) 115. The relay nodes may have multiple physical radio interfaces or a single physical radio interface divided into multiple logical interfaces. One or more physical or logical radio interfaces are access interfaces. The other interfaces are relay interfaces. The access interface(s) is used for end, devices to associate with/connect to the AP/RN for accessing the wireless network. The relay interface(s) is used to construct a backbone/infrastructure multi-hop wireless network for data (packet) forwarding between relay nodes. One or more relay nodes are connected to the wired infrastructure (network) 120 through the wired Internet backhaul interface of the GW/BS. Generally, the RNs are stationary but they need not be. The GW/BS is also called an Internet gateway. There can be more than one GW/BS in accordance with the principles of the present invention. However, only one is depicted in FIG. 1 for clarity on the diagram. End devices, such as PDAs, laptops, computers, cell phones etc. do not participate in the packet relay or route selection process. The end devices need to associate with/connect to an AP/RN to gain access to the wireless network. The end devices send and receive packets (data) to and from the AP/RN with which they are associated/connected. The remainder of the packet relay/routing/delivery to the destination is performed by the AP/RN using a routing protocol and routing metrics.

It is expected that most of the traffic in an infrastructure multi-hop wireless network will be traffic to/from the wired network or Internet. The present invention is directed to improving the performance of communications between an end device and the wired Internet via the GW/BS. It is assumed that a RN/AP within a multi-hop wireless network establishes and maintains a path to a GW/BS through a discovery and routing protocol or configuration.

It should be noted that the present invention is not limited to a single GW/BS scenario. The present invention is also applicable to multiple-gateway scenarios. In the case of multiple GWs/BSs in a multi-hop wireless network a RN/AP within a multi-hop wireless network can establish and maintain a path to a primary GW/BS, through a discovery and routing protocol or configuration. The traffic between the RN/AP and the outside wired network passes through the primary GW/BS. It is also possible that a RN/AP within a multi-hop wireless network establishes and maintains paths to multiple GWs/BSes and load-balancing is used when the RN/AP forwards traffic to the outside wired network.

Herein is described a joint AP/RN selection method based on a joint AP/RN selection metric called JSEL. The joint AP/RN selection metric takes into account both the access link quality from the end device to the associated AP/RN and the path metric inside the multi-hop wireless network from the associated AP/RN to the gateway.

The performance experienced by an end device depends heavily on the quality of both the access link (from the end device to the associated/connected AP/RN) and the quality of backbone path (from the associated/connected AP/RN to the GW/BS). Some APs/RNs may provide a good access link but the poor quality in the backbone path leads to poor performance of the system. Other APs/RNs may have a high-quality path to the GW/BS but have a lossy access link to the end device on the first hop, which also results in poor system performance. Therefore, to achieve good end-to-end performance, the AP selection criteria should consider the combination of these two factors (good access link quality and a high quality path to the GW/BS). Defined herein is a joint AP selection metric, by which an end device selects an AP with the best joint metric value. The joint metric can be formulated as $$JSEL = (1-\beta)M(a) + \beta M(p) \quad (1)$$

where M(a) is the access link metric, representing the access link quality between the end device and the AP/RN and M(p) reflects the quality of backbone path between the AP/RN and the GW/BS within the multi-hop wireless network. The backbone path (between the AP/RN and the GW/BS) is also called a relay backbone. An end device selects the AP with the best joint metric β is a design parameter (0<=β<=1). The expression in (1) can be viewed as a balance between access link quality and backbone path quality.

There may be multiple paths between a given AP and the GW/BS. An AP discovers and maintains a best path based on a specific routing metric through a proactive or reactive routing protocol in the relay backbone. M(p) represents the cost of the best path between the AP/RN, and the GW/BS in the relay backbone. However, the end devices are not involved in the routing and do not have the knowledge of the path quality between a candidate AP and the GW/BS. In the AP selection method of the present invention, the beacon of the AP/RN is enhanced to carry the path cost information between the AP and the GW/BS in the relay backbone.

Note that the AP selection method and joint metric formation of the present invention is general enough to work with any type of access link metrics and path metrics within a multi-hop network. For example, hop count, expected transmission time, expected transmission count, and radio and bandwidth aware routing path metrics can be selected as the path metric within multi-hop wireless networks. That is, any metrics including the above identified metrics can be used alone or in any combination. The selection of one or more path metrics is a configurable network parameter.

For the metric of access link quality M(a), it is possible to use a conventional metric, such as received signal strength indicator (RSSI), the number of associated end devices, the AP/RN load, and the average packet error rate of an end device. However, these prior art metrics do not completely and accurately capture all aspects of the access link quality and may lead to poor performance. Therefore, three new access link metrics are defined herein. The three new metrics defined herein more completely and accurately represent the access link quality. The selection of one of the three access link metrics defined herein is a configurable network parameter.

The first of the three new access link metrics is APETT, which is defined as the aggregated AP Expected Transmission Time of all the links between the AP/RN and its associated/connected end devices. Let C denote the set of end devices currently associated with/connected to the AP/RN and n is the new end device. If n associates with/connects to this AP/RN, then the APETT is $$APETT = \sum_{j \in C} ETT_j + ETT_n \quad (2)$$

where $$ETT_j = \left(T_{oh} + \frac{s}{r_j}\right) \times \frac{1}{1-E_j} \quad (3)$$

and where s denotes the size of the standard test packet (for example, packets of a standard size, such as 1024 bytes, (for simplicity, s can also be set to 1 in the calculation of the metric), $r_j$ denotes the link data rate between the end device j and the AP/RN. $T_{oh}$ is the radio overhead including the access overhead and the protocol overhead. Given a radio technology, $T_{oh}$ can be estimated. For example, for IEEE 802.11a, $T_{oh}$ is 185 μs. For simplicity, it is also possible to set $T_{oh}$ to 0. $r_j$ is the data rate of the link between end device j and the AP/RN at which the AP/RN and the end device j would exchange transmit standard test packets based on current access link conditions. The estimation of $r_j$ is dependent on local implementation of rate adaptation. $E_j$ is the packet loss rate on the access link between end device j and the AP/RN when standard test packets are transmitted at the current link data rate ($r_j$).

The second of the three new access link metrics, Contention-Aware Expected Transmission Time (CAETT), is defined as the expected transmission time for an end device to send a data packet to the associated AP while contending for transmission with other end devices associated with this AP.

Let C denote the set of end devices currently associated with/connected to the AP/RN and n is the new end device. If end device n associates with/connects to this AP/RN, the CAETT of the present invention can be formulated as $$CAETT_n = \frac{1}{1-E_n} \sum_{j \in C \cup n} \frac{s}{r_j} \quad (4)$$

Where $E_n$ is the packet loss rate on the link between n and AP/RN, and s denotes the size of the standard test packet (for example, packets of a standard size, such as 1024 bytes, (for simplicity, s can also be set to 1 in the calculation of the metric), $r_j$ is the link data rate between the end device j and the AP/RN. Note that $CAETT_n$ involves the new end device itself and captures the effect that end devices associated with/connected to an AP/RN contend among themselves for bandwidth and channel access. This means that the throughput that an end device can achieve depends not only on its own link data rate, but also on link data rates of the other end devices. Intuitively, an end device has to wait until other end devices complete their transmissions if the other end devices have succeeded in acquiring the channel during the previous channel contentions. The faster the other end devices transmit, the shorter the waiting time for this end device waiting to transmit. A low link data rate end device will reduce the throughput of the other devices. Assume that m end devices associate with/connect to an AP/RN, including the new end device. Due to contention in media access control protocol layer, each end device j associated with/connected to the AP/RN (j∈C∪n) will get equal transmission opportunity. If all access links between the end devices and the AP/RN are error free, each end device j being the transmitter for data packets and all packets being equal length/size, then the total network throughput is upper bounded by $$\frac{m}{\sum_{j \in C \cup n} \frac{1}{r_j}}.$$

The throughput of every node is thus upper bounded by $$\frac{1}{\sum_{j \in C \cup n} \frac{1}{r_j}}.$$

In addition, the $CAETT_n$ takes the packet loss rate over the access link into account. A lossy or noisy access link causes a greater number of retransmissions and decreases the throughput. The term $$\frac{1}{1-E_n}$$

in (4) is the average number of retransmissions to successfully deliver a packet to the receiver. Thus, (4) represents the expected transmission time for an end, device to transmit a packet, which is obtained by considering the impact of channel access contention, link data rate and packet loss.

The third of the three new access link metrics is Radio and AP Load Aware (RALA) Metric. The RALA of a new end device n is defined as an AP-load-adjusted expected transmission time of end device n. This metric incorporates channel available bandwidth awareness and load balancing. The end devices associated with/connected to an AP/RN share the access channel bandwidth. The RALA can be formulated as $$RALA = ETT_n x \frac{1}{1-\rho-\rho_n} = \left(T_{oh} + \frac{s}{r_n}\right) \times \frac{1}{1-E_n} \times \frac{1}{1-\rho-\rho_n} \quad (5)$$

where ρ denotes the current channel utilization without new end device n and $\rho_n$ denotes the channel utilization of the new end device. Since $\rho_n$ does not depend on which AP/RN that the end device n associates with/connects to, for simplicity, $\rho_n$ for a new end device can be set to 0 when the RALA metric is calculated.

In an alternative embodiment, the second term of equation (5) can be thought of a weighted packet error rate. For example, $\omega(E_r)=1$ if $E_r<E_0$; $\omega(E_r)=1/(1-E_r)$ if $E_0 \leq E \leq E_{max}$; and $\omega(E_r)=\infty$ if $E>E_{max}$. Links with packet error rates less than $E_0$ are weighted equally. Links with packet error rates between $E_0$ and $E_{max}$ are weighted increasingly with packet error rates. Links with packet error rates greater than $E_{max}$ are not considered in the AP selection because of very poor link quality. Similarly, the third term of equation (5) can be thought of as a weighted channel utilization. For example, $\omega(\rho)=1$ if $\rho<\rho_0$; $\omega(\rho)=1/(1-\rho-\rho_n)$ if $\rho_0 \leq \rho \leq \rho_{max}$; and $\omega(\rho)=\infty$ if, $\rho>\rho_{max}$. In the foregoing, the links with channel utilization less than $\rho_0$ are weighted equally. Links with channel utilization between $\rho_0$ and $\rho_{max}$ are given weights increasing with their channel utilization. Links with utilization greater than $\rho_{max}$ are not considered in the AP selection to avoid creating a hot spot in the network.

To calculate RALA, an end device needs to know the AP/RN channel utilization/load for its access links. The end device cannot accurately measure the AP/RN channel utilization due to hidden nodes. The AP/RN channel utilization has to be estimated by the AP/RN. The AP/RN measures the amount of channel busy time, $T_{busy}$, during every period of time $T_p$. The AP/RN channel utilization can be estimated as $$\frac{T_{busy}}{T_p}.$$

The AP beacon is enhanced to carry the AP/RN channel utilization information.

Note that after an end device is associated with/connected to an AP/RN, the channel utilization measured by its. AP/RN includes the load of this end device. But the channel utilization measured by other APs/RNs does not include the load of this end device. When an end device compares the RALA of other APs with that of the AP/RN with which it is currently associated/connected, in an effort to determine whether to switch to another AP/RN, the end device should take this factor into account. When an end device calculates the RALA metric for an AP/RN that it is not associated with/connected to, it adds its own traffic load into the AP traffic load aware metric.

To calculate the APETT, CAETT, and RALA metrics, an end device must know the packet loss rate and data rate of the link between the AP/RN and the end device (itself). In the prior art, probing packets have been used for measuring the packet loss rate and link data rate. That is, a node transmits the probing packets to measure the packet loss rate and link data rate. However, when a new end device desires to select an AP/RN, it is very difficult to measure the packet loss rate of the access link between the AP/RN and the new end device using probing packets because this measurement technique requires a certain number of samples to obtain accurate results. This requires a lengthy measurement interval. When an end device selects an AP/RN with which to associate/connect (either during its initialization period or during a handoff period to a new AP/RN due to access link quality deterioration of its current. AP/RN), the end device desires to make a decision quickly. In addition, it is also difficult to use beacons to measure the packet loss rate since the beacons are generally broadcast with a fixed low data rate, which is more tolerant of bit errors than other rates and which may be different from the actual data transmission rate. Thus, to reduce scanning time for the AP/RN selection, a hybrid approach of measurement and estimation to obtain the packet loss rate is used in the present invention. Specifically, the received signal strength of a beacon or probe response message is used to estimate the packet loss rate and expected data transmission rate.

Given a radio technology and physical-layer mode, the packet loss rate can be estimated from the channel signal-to-noise ratio (SNR) γ. For IEEE 802.11b with a physical layer (PHY) mode m, where m=1, 2, 3, and 4 for 1, 2, 5.5, and 11 Mbps data rates, respectively, the packet loss probability can be calculated by, $$E(m,s,\gamma)=1-(1-P_{e\_data}{}^m(s,\gamma))\cdot(1-P_{e\_ack}{}^m) \quad (6)$$

where s is the packet size. $P_{e\_data}{}^m(s,\gamma)$ and $P_{e\_ack}{}^m$ are the error probabilities for the data frame/packet and acknowledge (ACK) frame/packet, respectively. An ACK frame is always transmitted at the lowest rate and its size is much shorter than a data frame Therefore, the error probability of an ACK frame is very low compared to the error probability of a data frame, and hence the probability of successful transmission can be approximated as:

$$E(m,s,\gamma) \approx 1-(1-P_{e\_data}{}^m(s,\gamma)) \quad (7)$$

The error probability of a data frame is given by:

$$P_{e\_data}^m(s,\gamma) = 1 - (1-P_e^1(24,\gamma))(1-P_e^m(28+s,\gamma)) \quad (8)$$

where $P_e^1(24,\gamma)$ is the error probability of the header that is always transmitted with PHY mode 1, and $P_e^m(28+s,\gamma)$ is the error probability of the media access control (MAC) layer payload including the MAC overhead. Further, the $P_e^m(s,\gamma)$ can be expressed in terms of bit error rate $P_b^m(\gamma)$ as:

$$P_e^m(s,\gamma) = 1 - (1-P_b^m(\gamma))^{8s} \quad (9)$$

The bit error rate $P_b^m(\gamma)$ can be derived for each PHY mode m.

For IEEE 802.11a with a physical layer (PHY) mode m, an upper bound on the packet loss rate E is $$E(m, s, \gamma) < \sum_{d=d_{free}}^{s/R_c} a_d p_d \quad (10)$$

where s is the packet size and $d_{free}$ is the free distance of the convolutional code selected in PHY mode m; $a_d$ is the total number of distance-d errors, $R_c$ is the convolution code rate for mode m, and $p_d$ is the probability that an incorrect path is chosen by the Viterbi decoder at distance d from the correct path. When hard decision decoding is applied, $p_d$ is given by $$P_d(m,\gamma) = \begin{cases} \sum_{k=(d+1)/2}^{d} \binom{d}{k} P_b^k (1-P_b)^{d-k} & \text{if } d \text{ is odd} \\ \frac{1}{2}\binom{d}{d/2} P_b^{\frac{d}{2}}(1-P_b)^{\frac{d}{2}} + \\ \sum_{k=d/2}^{d} \binom{d}{k} P_b^k (1-P_b)^{d-k} & \text{if } d \text{ is even} \end{cases} \quad (11)$$

where $P_b$ is the bit error probability for the modulation scheme selected in IEEE 802.11a PHY mode m, which depends on channel SNR $\gamma$.

In the hybrid measurement and estimation approach of the present invention, the AP beacon or probe response messages are enhanced to carry the transmission power. The end device n estimates the received channel SNR from the beacon and/or probe responses. The end device then selects the PRY mode m or the data rate that minimizes $ETT_n$.

$$\text{Min}(ETT_n) = \text{Min}\{ETT_n(m,s,\gamma)|_m\} \quad (12)$$

This Min($ETT_n$) is used to compute the value of the APETT or the RALA metrics with the information carried in the enhanced beacon.

In an alternative embodiment, the end device selects the PHY mode m or the link data rate that minimizes $CAETT_n$.

$$\text{Min}(CAETT_n) = \text{Min}\left\{\frac{1}{1-E_n}\sum_{j \in C \cup n} \frac{s}{r_j}\bigg|_m\right\}. \quad (13)$$

Furthermore, in the present invention, an AP selection protocol is disclosed. The distributed AP selection protocol of the present invention allows an end device to determine, update and change the AP/RN with which to associate/connect. In general, an end device discovers APs/RNs in its neighborhood through scanning during its initial bootstrapping procedure. Scanning may be either active or passive. In passive scanning, the end device records information from all beacons it receives on each channel. In active scanning, the end device transmits a probe request message and the APs/RNs hearing the probe request respond with probe response messages to the scanning end device.

An AP/RN uses a proactive, on-demand, or hybrid routing protocol to establish and maintain a route/path to the GW/BS and learn the route/path cost between itself and the GW/BS inside the multi-hop wireless network. In the alternative, an AP/RN may establish and maintain a route/path to the GW/BS via a configuration mechanism.

Figure 2:
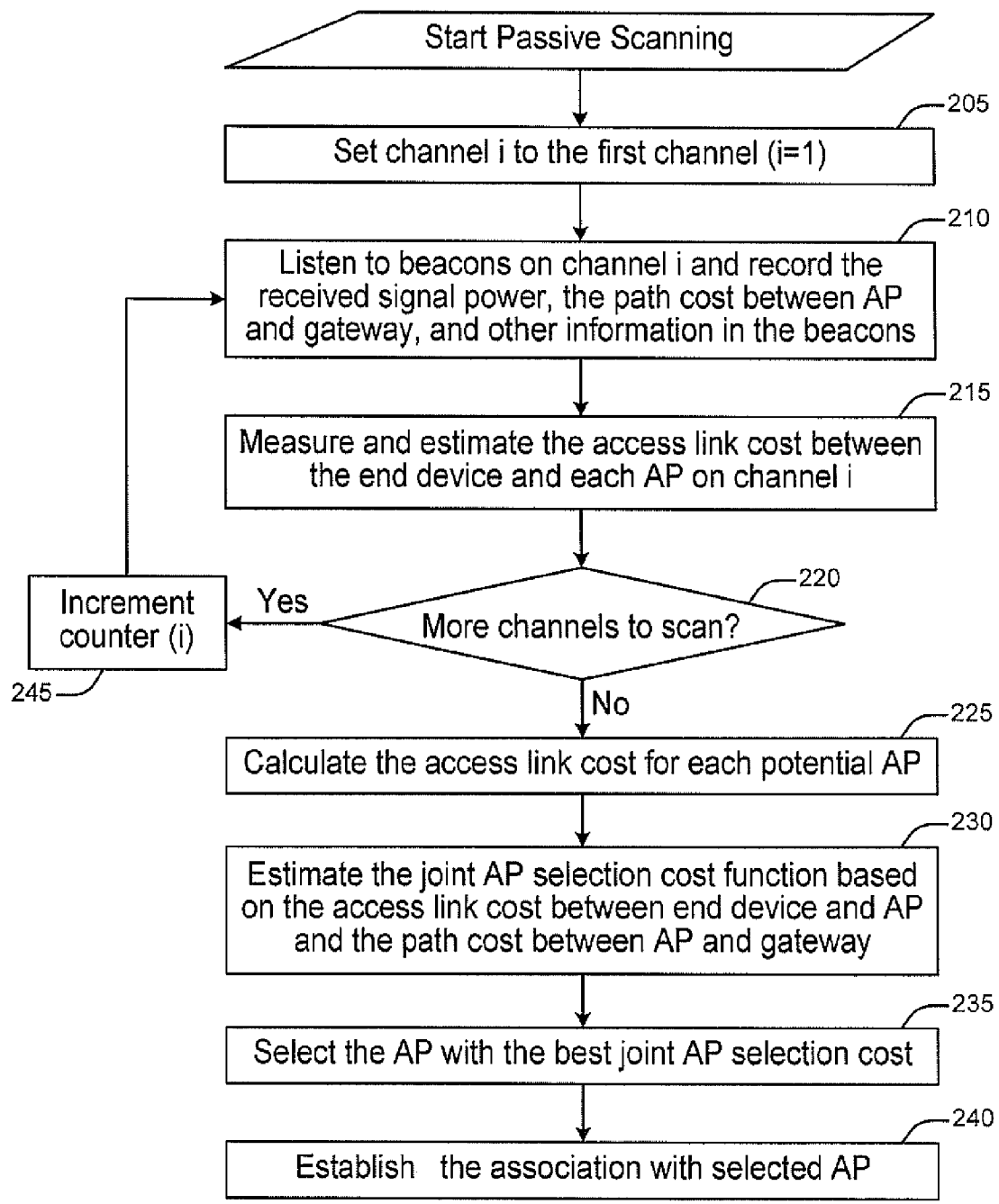
FIG. 2 is a flowchart that illustrates the AP selection method of the present invention using passive scanning.

Referring to FIG. 2, the AP selection method using passive scanning is illustrated. An end device listens to the enhanced beacons from the APs/RNs on each channel and records the received signal power and the information in all beacons it receives. In order to provide the end devices with the additional information for determining the AP selection, the beacons are enhanced to contain the path cost between the AP/RN and the GW/BS, the transmit power, the AP/RN load, the sum of the ETTs of the end devices currently associated with/connected to the AP/RN $$\left(\sum_{j \in C} ETT_j\right),$$

the throughput bound the end devices currently associated with/connected to the AP/RN $$\left(\frac{1}{\sum_{j \in C} \frac{1}{r_j}}\right),$$

and other information. These parameters are measured and estimated by the AP/RN and are needed for the end device to calculate the joint AP/RN selection metric. The end device also measures and estimates the access link quality between itself and each AP/RN from which it receives the beacon, including the packet loss rate and the link data rate. At the end of scanning, the end device has obtained information about the APs/RNs in its neighborhood. The end device then calculates the access link cost for each potential AP/RN. The end device then estimates the joint AP selection cost function JSEL according to (1), which captures the access link quality and the path quality from the AP/RN to the GW/BS in the multi-hop wireless network. It selects one of the APs/RNs with the best joint AP selection cost and establishes an association with/connection to the selected AP/RN.

Specifically, at 205, a counter or index is initialized to the first channel. The end device listens to the beacons it receives on the channel and records the received signal power and other information contained in the enhanced beacons that is receives on that channel at 210. The enhanced beacons contain the path cost between the AP/RN and the Internet GW/BS, the transmit power, the AP/RN load, the sum of the ETTs of the end devices currently associated with/connected to the AP/RN $$\left(\sum_{j\in C} ETT_j\right),$$

the throughput bound of the clients currently associated with/connected to the AP/RN $$\left(\sum_{j\in C}\frac{1}{\frac{1}{r_j}}\right),$$

and other information. These parameters are measured and estimated by the AP/RN and are needed for the end device to calculate the joint selection metric. The end device measures and estimates the access link cost/quality between itself and each AP/RN on the channel from which it receives the beacon, including the packet loss rate and the link data rate at 215. A test is performed at 220 to determine if there are more channels to scan. If there are no more channels to scan then the end device has obtained information about the APs/RNs in its neighborhood. The end device then calculates the access link cost for each potential AP/RN at 225. The end device then estimates the joint AP selection cost function JSEL at 230 according to (1), which captures the access link quality and the path quality from the AP/RN to the GW/BS in the multi-hop wireless network. The end device then selects one of the APs/RNs with the best joint AP selection cost at 235 and establishes an association with/connection to the selected AP/RN at 240. If there are more channels to scan then the counter/index is adjusted and the end device proceeds to 210. One of ordinary skill in the art would recognize that the counter/index could by incremented or decremented depending on the designer's preference. For purposes herein, incrementation is selected.

Figure 3:
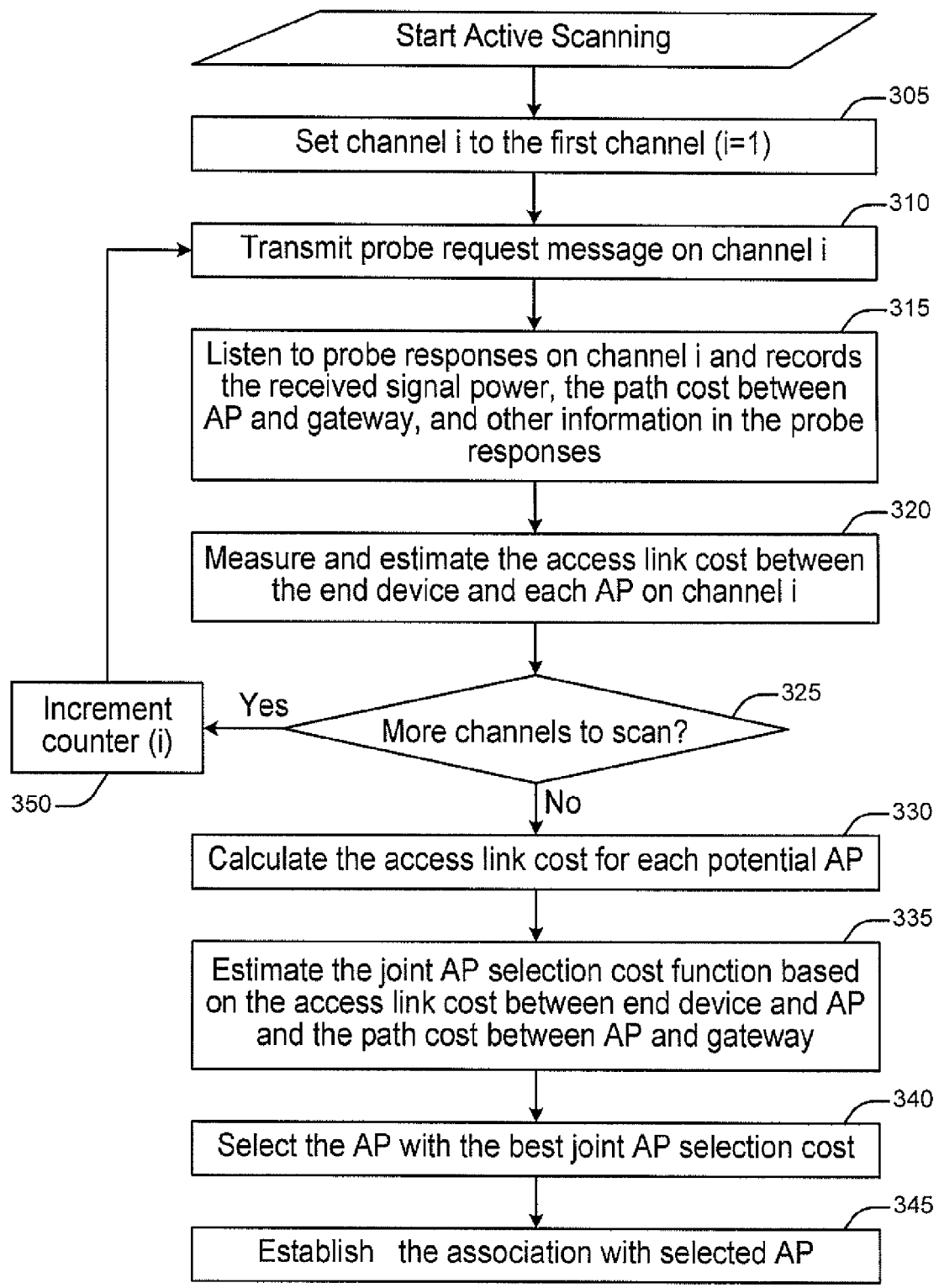
FIG. 3 is a flowchart that illustrates the AP selection method of the present invention using active scanning.

Referring to FIG. 3, the AP selection method using active scanning is illustrated. An end device transmits a probe request message on each channel and waits for enhanced probe response messages from the APs/RNs in the neighborhood. The end device records the received signal power and the information of all probe responses it receives. In order to provide the end devices with the additional information for determining the AP selection, the probe response message from each AP/RN is enhanced to contain the path cost between the AP/RN and the Internet GW/BS, the transmit power, the AP/RN load, the sum of the ETTs of the end devices currently associated with/connected to the AP/RN $$\left(\sum_{j\in C} ETT_j\right),$$

the throughout bound with the end devices currently associated with/connected to the AP/RN $$\left(\sum_{j\in C}\frac{1}{\frac{1}{r_j}}\right),$$

and other information. These parameters are measured and estimated by the AP/RN and are needed for the end device to Calculate the joint AP/RN selection metric. The end device also measures and estimates the access link quality between itself and each AP/RN from which it receives each probe response message, including the packet loss rate and the link data rate. At the end of scanning, the end device has obtained information about the APs/RNs in its neighborhood. The end device then calculates the access link metric for each potential AP/RN. The end device then estimates the joint AP selection cost function JSEL according to (1), which captures the access link quality and the path quality from the AP/RN to the GW/BS in the multi-hop wireless network. The end device then selects the APs/RNs with the best joint AP selection cost and establishes an association with/connection to the selected AP.

At 305, a counter or index is initialized to the first Channel. An end device transmits a probe request message on the channel at 310 and waits for enhanced probe response messages from the APs/RNs in the neighborhood on the channel at 315. Also at 315, the end device records the received signal power and the information of all probe responses it receives on the channel. In order to provide the end devices With the additional information for determining the AP selection, the probe response message from each AP/RN is enhanced to contain the path cost between the AP/RN and the Internet GW/BS, the transmit power, the AP/RN load, the sum of the ETTs of the end devices currently associated with/connected to the AP/RN $$\left(\sum_{j\in C} ETT_j\right),$$

the throughput bound with the end devices currently associated with/connected to the AP/RN $$\left(\sum_{j\in C}\frac{1}{\frac{1}{r_j}}\right),$$

and other information. These parameters are measured and estimated by the AP/RN and are needed for the end device to calculate the joint selection metric. The end device then also measures and estimates the access link cost/quality between itself and each AP/RN on the channel from which it receives each probe response message, including the packet loss rate and the link data rate at 320. A test is performed at 325 to determine if there are more channels to scan. If there are no more channels to scan then the end device has obtained information about the APs/RNs in its neighborhood. The end device then calculates the access link metric for each potential AP/RN at 330. The end device then estimates the joint AP selection cost function JSEL at 335 according to (1), which captures the access link quality and the path quality from the AP/RN to the GW/BS in the multi-hop wireless network. The end device then selects the APs/RNs with the best joint AP selection cost at 340 and establishes an association with/ connection to the selected AP at 345. If there are more channels to scan then the counter/index is adjusted and the end device proceeds to 310. One of ordinary skill in the art would recognize that the counter/index could by incremented or decremented depending on the designer's preference. For purposes herein, incrementation is selected.

Figure 4:
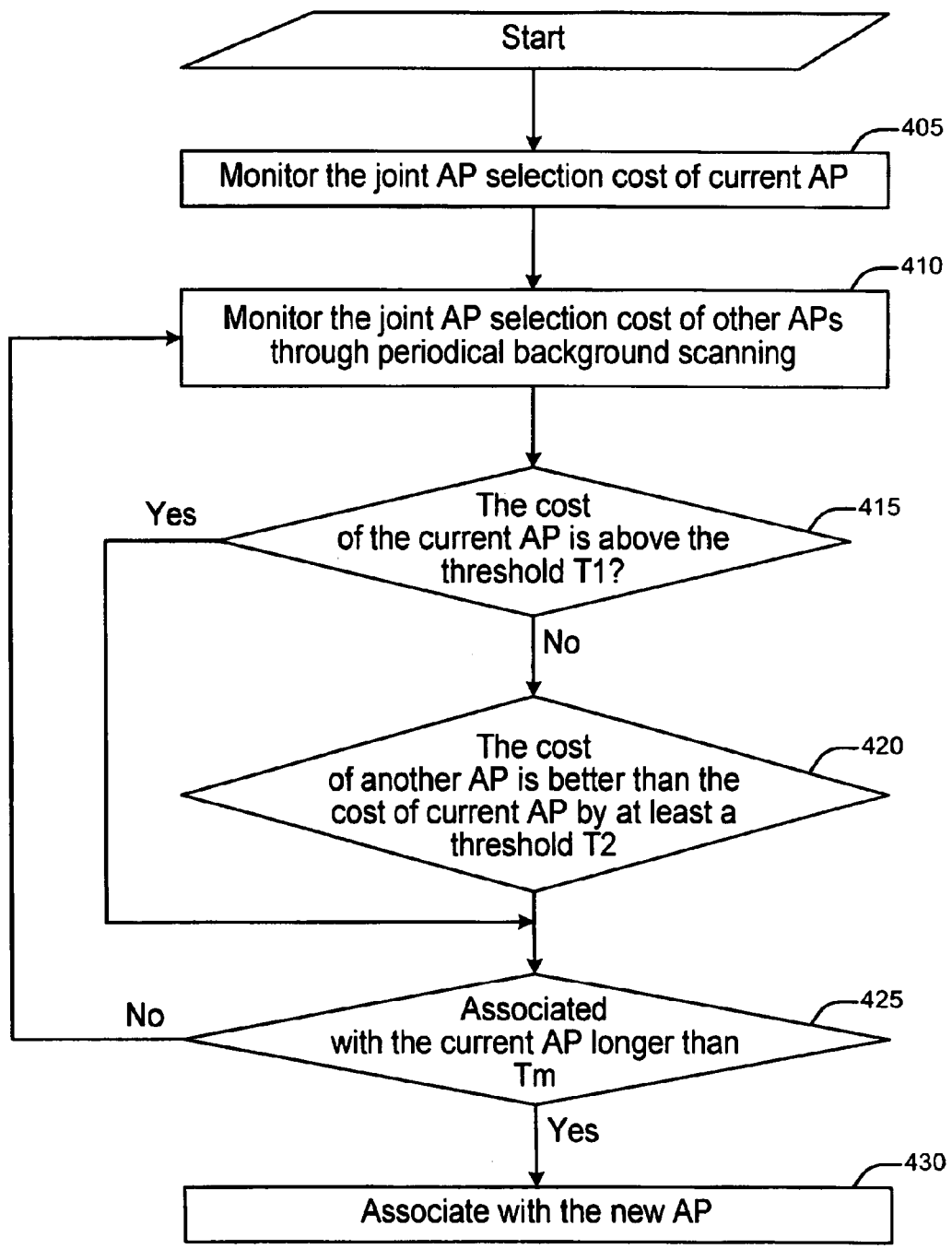
FIG. 4 is a flowchart that illustrates the periodic scanning method of the present invention.

Referring to FIG. 4, in order to cope with the frequent change of the condition of access link and the path between the AP/RN and GW/BS, after associating with/connected to the selected AP, the end device monitors the joint AP/RN selection cost of its current AP/RN and also monitors the joint AP/RN selection cost of other APs/RNs through periodical background scanning. If the joint AP/RN selection cost of the current AP/RN is above a threshold T1 or the joint AP/RN selection cost of another AP/RN is better/lower than the cost of the AP/RN with which the end device is currently associated/connected by at least a threshold T2 and the end device has been associated with/connected to the current AP/RN longer than a time period $T_m$, the end device initiates an association with/connection to a new AP/RN (after disconnecting from/disassociating with the current AP/RN). The thresholds T1 and T2 as well as background scanning interval are used to prevent the churning of selected AP/RN. After associating with/connecting to a new AP, the end device uses the new AP/RN for at least a minimum time $T_m$. A special case is to set $T_m$ to 0. The above provides for AP/RN selection stability while still achieving quick response to changing link quality conditions and traffic load. Other means to handle the frequent change changes in link quality and traffic load include the use of a quantized metric.

Specifically, the end device monitors the joint AP/RN selection cost of its current AP/RN at 405 and also monitors the joint AP/RN selection cost of other APs/RNs through periodical background scanning at 410. A test is performed at 415 to determine if the cost of the current AP/RN is above a threshold T1. If the joint AP/RN selection cost of the current AP/RN is not above threshold T1, then another test is performed at 420 to determine if the joint AP/RN selection cost of another AP/RN is better/lower than the joint AP/RN selection cost of the AP/RN with which the end device is currently associated/connected by at least a threshold T2. If the joint AP/RN Selection cost of another AP/RN is better/lower than the joint AP/RN selection cost of the current AP/RN by at least threshold T2 then another test is performed at 425 to determine if the end device has been associated with/connected to the current AP/RN longer than a time period $T_m$. If the connection has continued for at least $T_m$ then the end device initiates an association with/connection to a new AP/RN at 430 (after the end device disconnects from/disassociates with the current AP/RN). The thresholds T1 and T2 as well as background scanning interval are used to prevent the churning of selected AP/RN. After associating with/connecting to a new AP, the end device uses the new AP/RN for at least a minimum time $T_m$. If the end device has not associated with/been connected to the AP/RN for longer than $T_m$ then the end device proceeds to 405. If the joint AP/RN selection cost of another AP/RN is not better than the joint AP/RN selection cost of the current AP/RN by at least threshold T2, then the end device proceeds to 405. If the joint AP/RN selection cost of the current AP/RN association/connection is above threshold T1, then the end device proceeds to the test performed at 425. T1, T2, and $T_m$ are configuration parameters. For example, as indicated above a special case is to set $T_m$ to 0.

Figure 5:
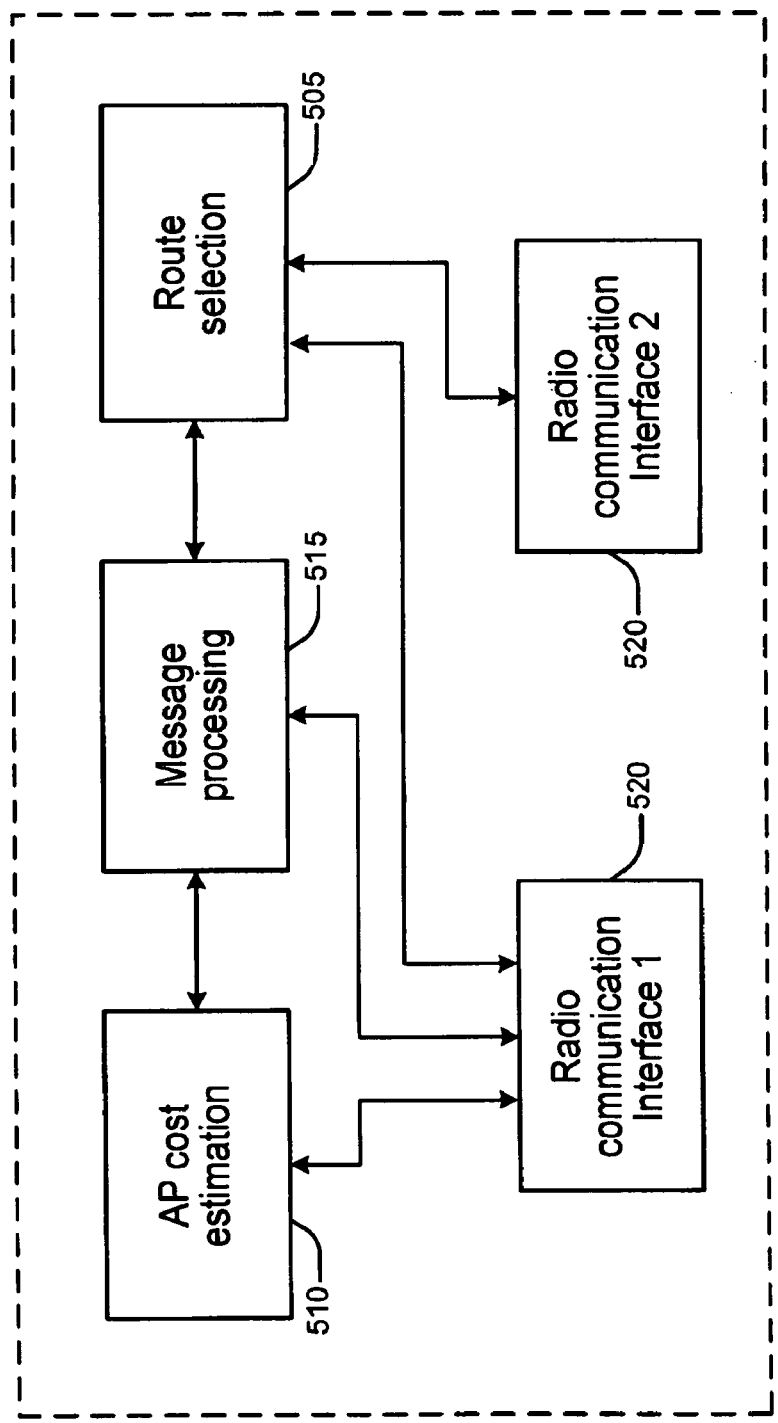
FIG. 5 is a block diagram illustrating an exemplary embodiment of the details of an AP/RN of the present invention.

FIG. 5 is a block diagram illustrating an exemplary embodiment of the details of an AP/RN of the present invention. The AP/RN includes, among other components, a route selection module 505, an AP cost estimation module 510, a message process module 515, and one or more radio communication interface modules 520. The AP cost estimation module measures and estimates the AP/RN load, the sum of the ETTs of the end devices currently associated with/connected to the AP/RN $$\left(\sum_{j \in C} ETT_j\right),$$

the throughput bound of the end devices currently associated with/connected to the AP/RN $$\left(\frac{1}{\sum_{j \in C} \frac{1}{r_j}}\right).$$

The message process module sends the enhanced beacon messages. It also processes the probe request messages and replies with the probe response messages through the radio communication interface(s). The AP estimation results are communicated to the end devices in the enhanced beacon or probe response messages. The route selection module establishes and maintains the path between the GW/BS and itself. It determines the route and the radio interface by which to forward (data) packets. It also has the information on the path metrics between the GW/BS and itself. It communicates the path metric information to the message process module and the path metric is also included in the enhanced beacons or probe response messages.

Figure 6:
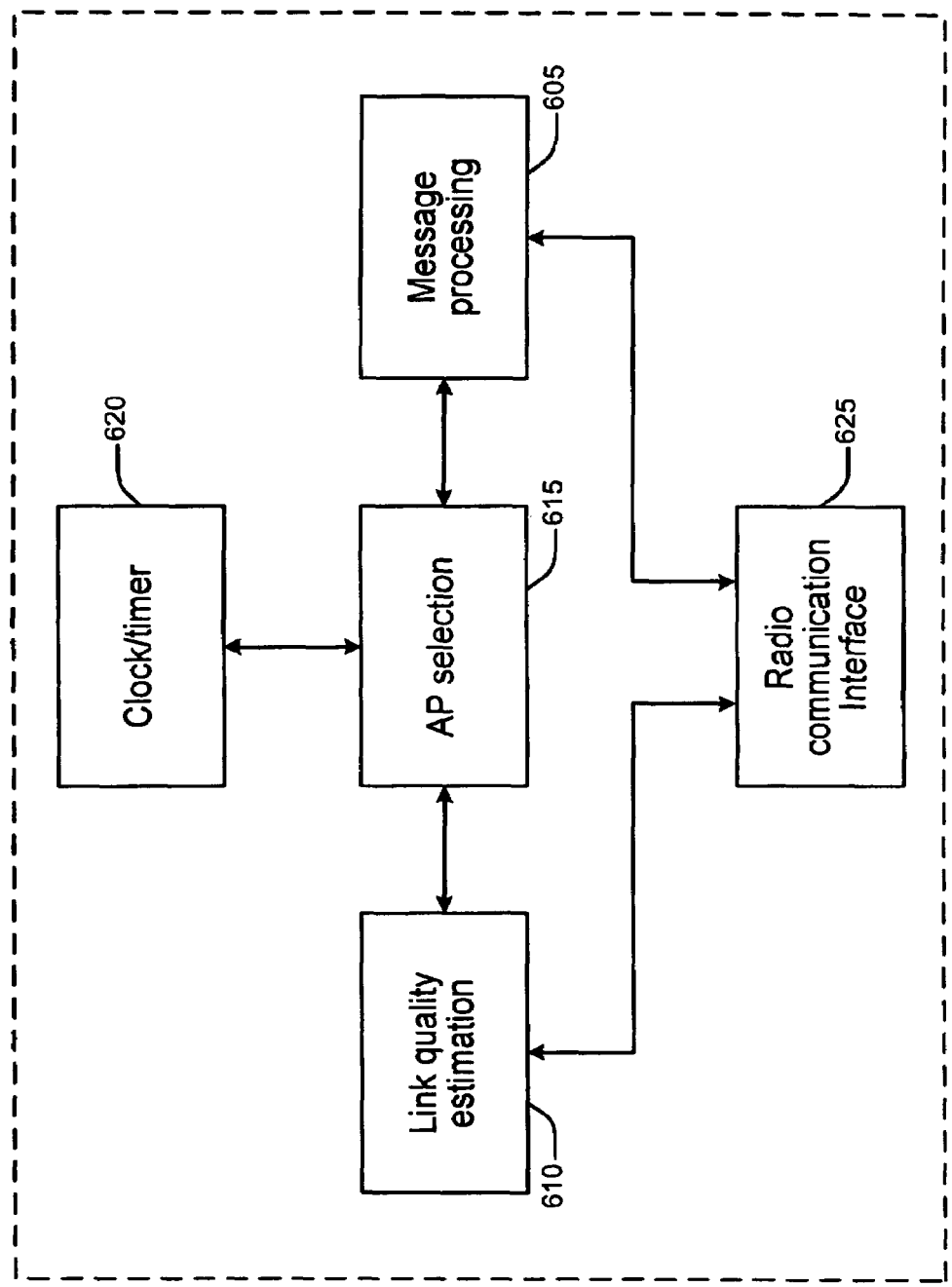
FIG. 6 is a block diagram illustrating the details of an end device in accordance to the present invention.

FIG. 6 is a block diagram illustrating the details of an end device in accordance to the present invention. The end device includes, among other components, a message processing module 605, a link quality estimation module 610, an AP selection module 615, a clock timer 620 and a radio communication interface module 625. The message process module processes the enhanced beacons received via the radio interface. It also sends the probe request messages via the radio interface and processes the received probe response messages. The link quality estimation module measures and estimates the access link quality, between the AP/RN and the end device, including the packet loss rate and the link data rate. The AP selection module calculates the joint AP selection metric for each AP/RN in the neighborhood and determines which AP/RN the end device associates with/connects to. The clock timer is used to ensure that each connection remains/continues for time period $T_m$.

Simulation results indicate that jointly considering the access link quality between the end device and the AP/RN and the path quality of the AP/RN to the GW/BS during AP/RN selection in the multi-hop wireless networks greatly improves the communication quality by providing higher throughput and lower end-to-end delay.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method for selecting an access point in a wireless network, said method comprising:
   initializing a channel index;
   recording a received signal power and information contained in one of a beacon message and a probe request response message, wherein said information contained in said beacon or said probe response message includes a path cost metric, an indication of the transmission power, an access point load, a sum of expected transmission times of all end devices currently connected to said candidate access point, a throughput bound for all of said end devices currently connected to said candidate access point, wherein said above information is one of measured and estimated by said candidate access point;
   calculating an access link cost for each candidate access point, said access link cost being between an end device and each candidate access point on a channel indexed by said channel index, responsive to said received signal power and said information;
   receiving a path cost between each said candidate access point and a gateway;
   estimating a cost function using said access link cost and said path cost;
   selecting one of said candidate access points based on said cost function; and
   establishing a connection with said selected access point.

2. The method according to claim 1, further comprising listening to said beacon on said channel indexed by said channel index.

3. The method according to claim 2, further comprising;
   determining if there are more channels to scan; and
   adjusting said channel index to a next channel, if there are more channels to scan.

4. The method according to claim 2, wherein said received signal power is used to estimate a packet loss rate and an expected data transmission rate.

5. The method according to claim 1, wherein said cost function is a sum of said access link cost and said path cost between said candidate access point and a said gateway, wherein said path cost is a backbone path performance metric.

6. The method according to claim 1, wherein said wireless network is one of a mesh network and a tree based network.

7. The method according to claim 1, further comprising:
   transmitting a probe request message on a channel indexed by said channel index; and
   receiving said probe request response message.

8. The method according to claim 7, further comprising;
   determining if there are more channels to scan; and
   adjusting said channel index to a next channel, if there are more channels to scan.

9. The method according to claim 7, wherein said received signal power is used to estimate a packet loss rate and an expected data transmission rate.

10. An apparatus for selecting an access point in a wireless network, comprising:
    means for initializing a channel index;
    means for recording a received signal power and information contained in one of a beacon message and a probe request response message, wherein said information contained in said beacon or said probe response message includes a path cost metric, an indication of the transmission power, an access point load, a sum of expected transmission times of all end devices currently connected to said candidate access point, a throughput bound for all of said end devices currently connected to said candidate access point, wherein said above information is one of measured and estimated by said candidate access point;
    means for calculating an access link cost for each candidate access point, said access link cost being between an end device and each candidate access point on a channel indexed by said channel index, responsive to said received signal power and said information;
    means for receiving a path cost between each candidate access point and a gateway;
    means for estimating a cost function using said access link cost and said path cost;
    means for selecting one of said candidate access points based on said cost function; and
    means for establishing a connection with said selected access point.

11. The apparatus according to claim 10, further comprising:
    means for listening to a beacon on said channel indexed by said channel index.

12. The apparatus according to claim 11, further comprising;
    means for determining if there are more channels to scan; and
    means for adjusting said channel index to a next channel, if there are more channels to scan.

13. The apparatus according to claim 11, wherein said received signal power is used to estimate a packet loss rate and an expected data transmission rate.

14. The apparatus according to claim 10, wherein said cost function is a sum of said access link cost and said path cost between said candidate access point and a said gateway, wherein said path cost is a backbone path performance metric.

15. The apparatus according to claim 10, further comprising:
    means for transmitting a probe request message on a channel indexed by said channel index; and
    means for receiving a said probe request response message.

16. The apparatus according to claim 15, further comprising;
    means for determining if there are more channels to scan; and
    means for adjusting said channel index to a next channel, if there are more channels to scan.

17. The apparatus according to claim 15, wherein said received signal power is used to estimate a packet loss rate and an expected data transmission rate.

* * * * *